Figure 15:
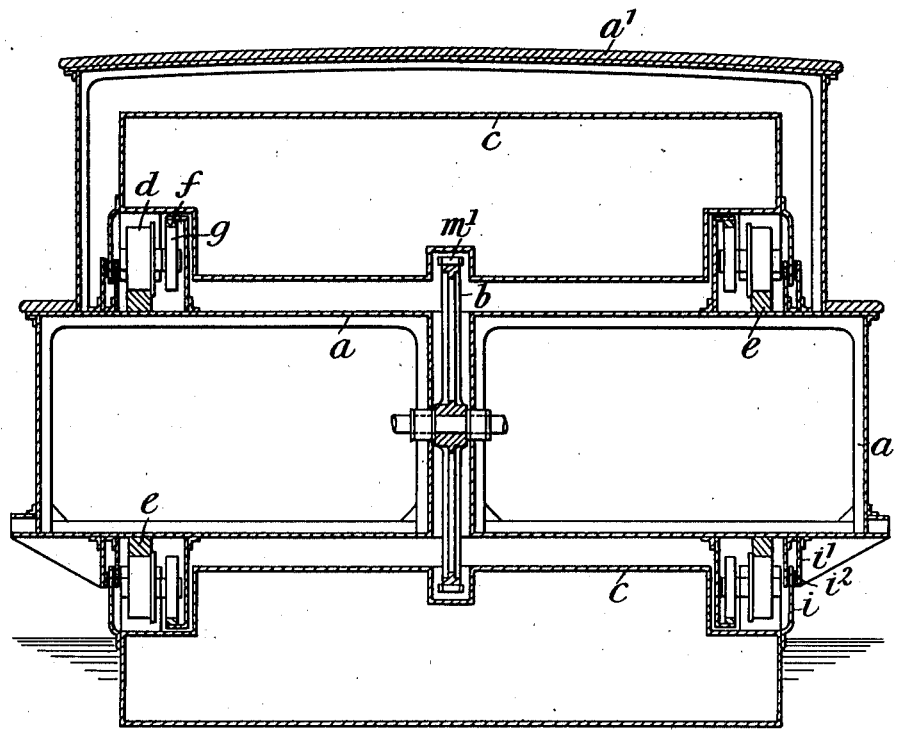

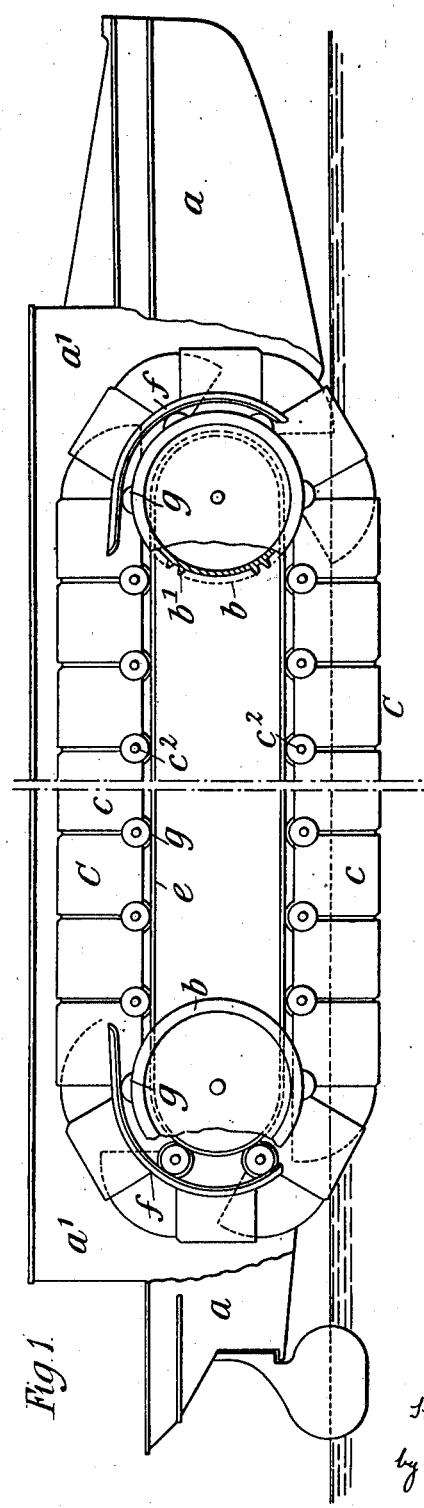

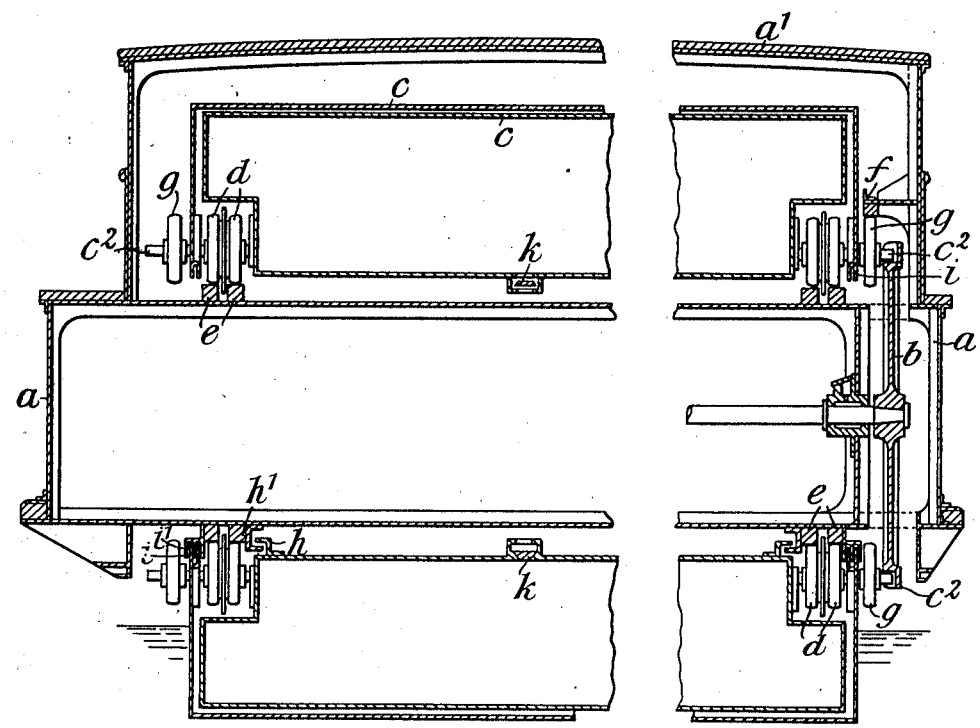

H. F. ALEXANDER.
VESSEL.
APPLICATION FILED MAR. 13, 1909.
953,165.
Patented Mar. 29, 1910.
5 SHEETS—SHEET 3.
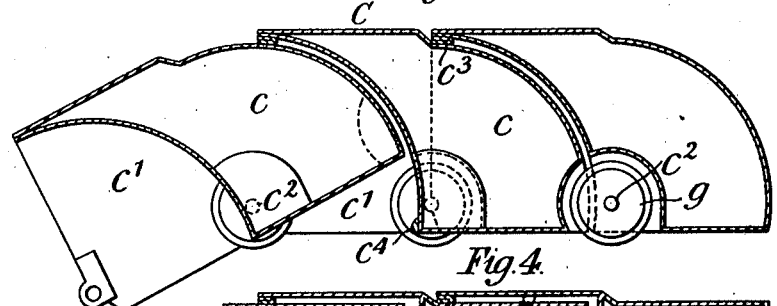
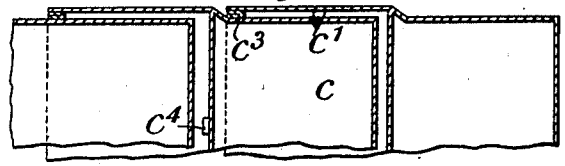
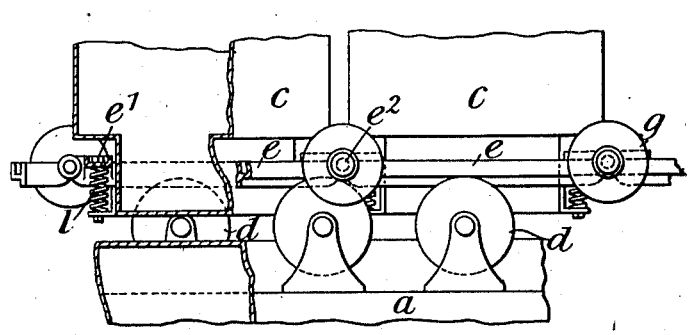
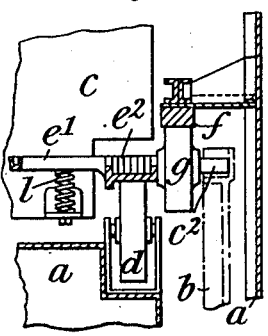
Witnesses:
Inventor
Herbert Francis Alexander
by
his Attorney H. F. ALEXANDER.
VESSEL.
APPLICATION FILED MAR. 13, 1909.
953,165.
Patented Mar. 29, 1910.
5 SHEETS—SHEET 4.
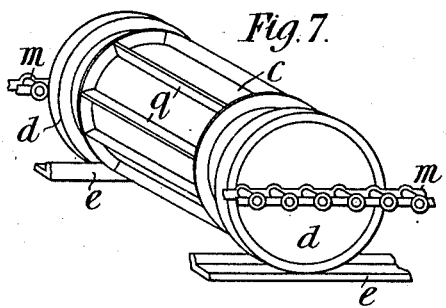
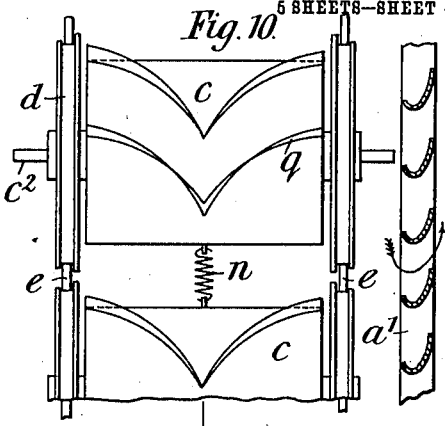
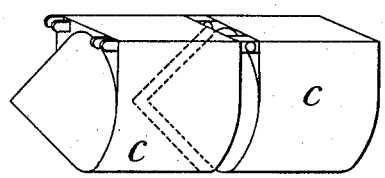
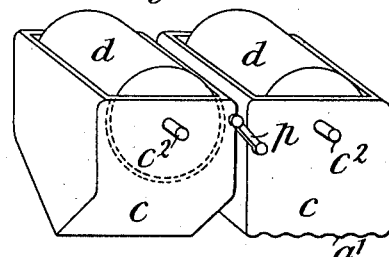
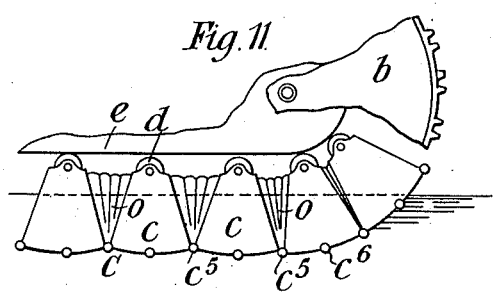
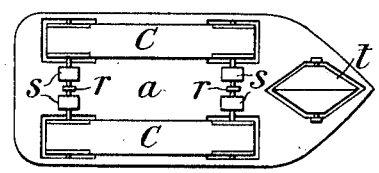
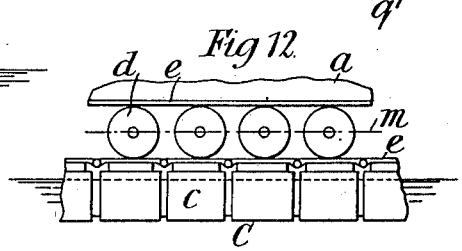
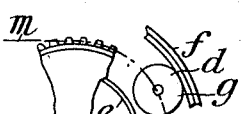
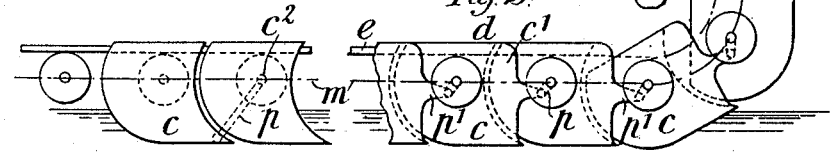
Witnesses:
Inventor
Herbert Francis Alexander
by his Attorney

UNITED STATES PATENT OFFICE.

HERBERT FRANCIS ALEXANDER, OF NEWCASTLE-UPON-TYNE, ENGLAND.

VESSEL.

953,165.  Specification of Letters Patent.  Patented Mar. 29, 1910.

Application filed March 13, 1909. Serial No. 483,098.

*To all whom it may concern:*

Be it known that I, HERBERT FRANCIS ALEXANDER, a subject of His Majesty the King of Great Britain, residing at 34 Burdon Terrace, Newcastle-upon-Tyne, England, naval architect, have invented certain new and useful Improvements in Vessels; and I do hereby declare the following to be a full, clear, and exact description of the invention, such as will enable others skilled in the art to which it appertains to make and use the same.

It has heretofore been proposed to construct a ship comprising a hull portion or body proper supported clear of the water by means of an endless chain composed of linked buoyant members or floats, forming as it were a continuous paddle wheel. It is obvious that such a construction, if practicable, would considerably reduce fluid resistance to the advance of the vessel.

The present invention relates to constructional improvements designed to render practicable the construction of vessels of all sizes on the lines indicated above. To this end I provide means whereby the endless chain of buoyant members may give support to and be supported by the hull or body proper intermediate of the end wheels over which it travels, as by providing the hull with suitable tracks or guideways over which antifriction wheels or rollers provided to the buoyant chain travel, or the buoyant chain may carry guideways or track surfaces composed of rigid guideway sections hinged together, the hull carrying antifriction wheels or rollers, or a series or chain of antifriction wheels or rollers may be interposed between guideways or tracks carried by the hull and buoyant chain respectively and travel around with, or in some cases drive, the latter. In some cases the antifriction wheels or rollers may themselves be buoyant when carried by the buoyant chain, or when connected together as an endless chain, two concentrically disposed buoyant chains in the same plane being in the latter case provided which may if desired be driven at the same or at different linear velocities as will hereinafter appear. Or the buoyant members of the chain may be freely revoluble and travel over guideways carried by the hull.

My invention also provides for preventing the lifting of the buoyant chain from its end wheels by centrifugal action and for regulating its tension.

The vessel may be propelled by any ordinary known means, and the buoyant chain or chains merely travel around freely as the vessel moves, or reliance for propulsion may be placed wholly or partially on the said chain or chains, the latter being then positively driven, and preferably provided with blades or roughened surfaces to enhance their propulsive thrust.

My invention is also designed to improve the construction and arrangement of the buoyant members composing the endless chain with a view to preventing the entrance and nipping between such members, of solid bodies that may be floating in the water and also with a view to diminishing air resistance to said members and fluid resistance and shocks to them as they enter the water. This may be effected by suitably shaping and constructing the buoyant members as hereinafter described, also by causing them to overlap or telescope into one another so as to present a substantially continuous outer surface at all portions of their travel, various suitable arrangements being hereinafter described.

In combination with the aforesaid buoyant chain or chains I may sometimes use freely revoluble buoyant supports, such as freely revoluble cylinders, spheres or cones, provided to the hull portion so as to be met and rotated by the oncoming waves. I may also reduce noise and shocks caused by the motion of the buoyant chain and its adjustments by the suitable employment of resilient and sound deadening devices, such as springs and rubber buffers or cushions.

The constructional improvements above outlined, together with others, will be fully described with reference to the annexed drawings in which similar letters refer to corresponding parts in all the figures (which are of a more or less diagrammatic nature) and wherein:—

Figure 1 shows in part sectional elevation a vessel constructed in accordance with my invention. Fig. 2 shows two cross sections of Fig. 1, the right hand section being taken through the axis of one of the end wheels of the buoyant chain, and the left hand section being taken intermediate of the end wheels. Fig. 3 is a sectional elevation, and Fig. 4 a sectional plan, showing buoyant chain members of the telescopic or overlapping type in accordance with my invention. Fig. 5 is a part sectional elevation showing a method of supporting the buoyant chain members upon antifriction wheels carried by the hull. Fig. 6 is a cross section of Fig. 5. Figs. 7, 8 and 9 are perspective views, Fig. 10 is a plan and Fig. 11 an elevation, illustrating various forms and constructions of buoyant chain members. Figs. 12 and 13 are diagrammatic views showing in elevation buoyant chain members whereof the supporting antifriction rollers are linked together by an endless pitch chain. Fig. 14 is a diagram plan of a ship having a pair of endless chains. Fig. 15 is a transverse section of a vessel showing some slight modifications of the arrangement illustrated in Fig. 2, and Figs. 16, 17 and 18 are details.

Referring to Figs. 1 and 2, $a$ is the hull or body proper whereon are carried sprocket wheels $b$ around which passes an endless chain C of buoyant members $c$. This chain is supported by and gives support to the hull $a$ intermediate of the end wheels $b$ by causing antifriction wheels $d$ (Fig. 2) provided to chain C to travel over tracks or guideways $e$ carried by the hull $a$, which latter extends in front and rear of said chain C.

$a'$ is a casing carried by the hull $a$ and inclosing the upper portion of the chain C, said casing being so shaped as to offer as little resistance as possible to the air, one of its functions being to reduce air resistance to the moving chain, it may also, especially in large vessels, form a deck or part of the hull or main structure $a$. In order to prevent the chain C from lifting from the end wheels $b$ by centrifugal action, guideways $f$ partially surrounding these wheels are engaged by the antifriction wheels $g$ carried by the chain C. Sagging of the chain in wave troughs is prevented by furnishing the buoyant members of the same with engaging members such as $h$ (Fig. 2) adapted to engage and slide in channel rails or guides $h'$ carried by the hull $a$. Water may be prevented from entering between the chain C and the hull and reaching the wheels $d$ by providing the former with flanges $i$ (Fig. 2) carried by each buoyant member $c$ and adapted to fit closely and slide between flanges $i'$ carried by the hull $a$. $k$ indicates ventilating valves provided to the buoyant chain members $c$, the same being arranged to automatically close when the chain C travels along its lower line, and to open while the same travels along its upper line.

A very suitable construction of overlapping or telescopic buoyant chain members is shown in Figs. 3 and 4. Each buoyant member comprises a closed chamber $c$ convex on one side and concave on the other, at each end of the concave side are wings $c'$ between which enters the convex side of the adjacent buoyant member which is pivoted to said wings at $c^2$. The pivots are conveniently provided, as shown, by shafts $c^2$ which carry the antifriction wheels $d$ $g$ before referred to. The curves of the sides of the buoyant chambers $c$ being concentric with the pivots $c^2$ the buoyant chambers will collapse or telescope into one another and the chain C will present a substantially continuous outer surface throughout its length as seen in Fig. 1. In order to avoid noise and shocks caused by the movement of the buoyant chain C packings of sound deadening material such as $c^3$ may be suitably applied between the relatively moving portions of the buoyant chain members and buffers of india rubber or the like, such as $c^4$, may be provided for the same purpose.

In Figs. 1 and 2 the chain C is represented as being positively driven, the teeth $b'$ of the sprockets $b$ engaging extensions of the shaft $c^2$ which pivotally connects the chain members $c$.

In Figs. 5 and 6 antifriction wheels $d$ are mounted on the hull $a$ and the guideways are carried by the chain C. These guideways each comprise an endless chain of rigid guideway sections $e$ pivotally connected at points $e^2$ intermediate of the buoyant members $c$, which latter are connected by springs $l$ with cross bars $e'$ which connect together the guideways on each side of the buoyant chain. Flush hinges should be used at $e^2$ to pass easily over the wheels $d$. Extensions $c^2$ of the pivotal connection $e^2$ are engaged by the teeth of the end wheels or sprockets $b$.

Fig. 7 shows a buoyant chain member of revoluble type, consisting of a drum $c$, revoluble about a shaft connecting two pitch chains $m$ which may pass over and be driven by sprockets such as $b$, Figs. 1 and 2. The ends of the drum are provided with the antifriction wheels $d$ which travel over the guideways $e$ carried by the hull.

Fig. 8 shows buoyant chain members $c$ each coned or pointed at that end which enters the water and recessed at the opposite end to receive the cone or point of the adjacent member. This construction also reduces fluid shocks to the buoyant members on entering the water. For the same purpose the lower or most deeply immersed side of the buoyant members may be made angular or wedge-shaped as shown by the left hand buoyant member $c$ in Fig. 9.

In Fig. 9 is also illustrated the combination of buoyant members of the revoluble and non-revoluble type. Each buoyant member of the chain comprises a buoyant non-revoluble chamber $c$ adapted to receive a buoyant drum $d$ revoluble on a shaft $c^2$ whereof the extensions may be engaged by the sprockets $b$ before mentioned, the chambers $c$ being suitably linked together or pivotally connected. The buoyant revoluble drums $d$ may also serve as the antifriction wheels or rollers to the buoyant chain, traveling over guideways of the hull.

Another form of combined revoluble and non-revoluble buoyant chain member is also shown in Fig. 10, where the buoyant drums or chambers $c$ freely mounted on the shafts $c^2$, whereof extensions may be engaged by the driving sprockets $b$, are connected together as by the springs $n$ to prevent their rotation, while said shafts also carry freely revoluble wheels $d$ traveling over the guideways $e$ of the hull $a$. The wheels may also be buoyant and provided with resilient rims or tires of any suitable construction to reduce noise and vibration. In this figure is also diagrammatically shown how the casing $a'$ before referred to may be furnished with air deflecting apertures through which the air currents caused by the movement of the buoyant chain C may escape and be deflected backward.

Fig. 11 shows buoyant chain members $c$ pivotally connected at their outer sides at $c^5$ so that the buoyant chain presents a continuous outer surface, the wedge-shaped spaces left between the members $c$ when traveling in a straight line being here shown as covered in with collapsible or bellows like watertight connections $o$. The pivots $c^5$ may be extended and together with the intermediate projections $c^6$ be engaged by the sprocket teeth of the end wheels $b$.

In Fig. 12 an endless chain of rollers $d$ connected together on either side by a pitch chain $m$ is interposed between guideways $e$ of the hull $a$ and hinged guideways $e$ carried by the buoyant chain C with which latter the rollers $d$ travel around. Either the buoyant chain C or the chain of rollers $d$ may be driven by the end wheels $b$, if the chain of rollers $d$ be positively driven the buoyant chain C may be frictionally driven by the rollers $d$ at twice their linear speed.

In cases where a chain of non-revoluble buoyant members $c$ is driven by connecting the pivotal points $c^2$ of such members with pitch chains $m$ engaged by the sprocket wheels $b$, as shown for example in the diagrammatic view Fig. 13, the buoyant members $c$ would preferably be connected by links such as $p$ set at an angle to the horizontal line of movement, as shown, this arrangement maintaining proper separation between said members and preventing them from jamming as they pass around the end curves of the guideways $e$, which, if at all closely set they would otherwise do, owing to the reduction on these curves of the distances between said pivotal points $c^2$, these distances being here only the chords of the pitch chain arcs connecting the pivotal points $c^2$. At the left hand of Fig. 13 the links $p$ are shown as connecting the pivot $c^2$ of one buoyant member $c$ with the lower part of the adjacent buoyant member, said members having here no end wings $c'$; to the right of this figure the buoyant members $c$ are shown as having end overlapping portions or wings $c'$ furnished with short arms $p'$ with which the angular connecting links $p$ are connected. An angular connecting link $p$ is also shown in Fig. 9, and would preferably be employed were the pivots $c^2$ of these buoyant members connected to pitch chains passing over the end wheels $b$.

Where the buoyant chain is to be used for propulsion, and is positively driven, its buoyant members $c$ will be preferably furnished with suitable blades, or otherwise constructed to give them a grip on the water. In Fig. 7 blades $q$ are shown provided to the revoluble buoyant member $c$, and in Fig. 10 V shaped blades $q$ are represented, arranged so that their angles or points first enter the water. In Fig. 9 for the same purpose the under or most deeply immersed surface of the right hand buoyant member $c$ is shown as having corrugations or flutings $q'$.

The diagram, Fig. 14, shows a vessel having a pair of buoyant chains C arranged side by side and parallel to one another. Provision may be made for driving both chains simultaneously or either independently and if desired in opposite directions at the same time. For example, each driving shaft may be in two portions coupled at will by a suitable clutch $r$ and each portion of each shaft may be furnished with an independent motor $s$. In all cases, whether using a single chain or a plurality of chains, it will be preferable to drive the sprocket wheels at both ends of each chain simultaneously, thus reducing the tension in the upper portion of the chain. $t$ indicates a freely revoluble buoyant support, here shown in the form of a double cone, which may be mounted at the fore part of the hull $a$ if desired to here provide buoyancy if necessary.

Figure 16:
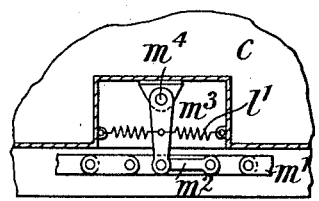
Figure 17:
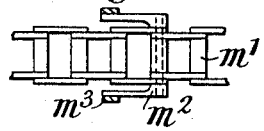

The arrangement, Fig. 15, differs from Fig. 2 chiefly in that the buoyant chain is here centrally driven in lieu of from either side; the centrifugal guideways $f$ are also carried around the whole course of travel and constitute also antisagging guideways for the lower portion of the buoyant chain. The driving sprockets $b$ are mounted centrally of the hull $a$ and an endless pitch chain $m'$ which passes over them is suitably connected with the center of each buoyant member $c$. Details of a convenient resilient connection between the buoyant chambers $c$ and the pitch chain $m'$ are shown in Figs. 16 and 17. Certain of the pivots of the pitch chain $m'$ are extended and carry arms $m^2$ to which are pivoted links $m^3$ pivoted to the buoyant members $c$ at $m^4$. Springs $l'$ connect these links with the buoyant members $c$ so as to take up shocks or jerks transmitted thereto from the pitch chain.

Figure 18:
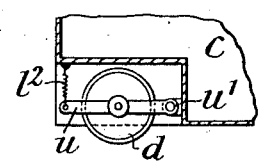

The detail Fig. 18, shows a method of resiliently mounting the antifriction wheels $d$ $g$ on the buoyant members $c$, the shaft of said wheels being carried in a frame $u$ pivoted to the buoyant member at $u'$ and having a spring or springs $l^2$ interposed between its free side and the said buoyant member. The means for preventing the entrance of water between the buoyant chain and the hull is shown in Fig. 15 as consisting of a flange $i$ provided to each buoyant chain member $c$ and slidable between two flanges $i'$ provided to the hull $a$ one of which carries a suitable packing $i^2$.

Means independent of those used for propulsion may also be provided for moving the buoyant chain when desired so as to bring any buoyant member or members above the water for inspection repairs or the like.

It is to be understood that I do not confine myself to the precise constructional details described with reference to and illustrated in the drawings, the same being obviously capable of variation without departing from my invention.

I would observe that I am aware that a wholly flexible continuous endless belt or endless pneumatic tube flotation member, passed around end wheels and traveling over intermediate wheels carried by a hull which it is designed to support and propel, has before been proposed, and that my invention is not designed for application to, nor claimed in connection with such an arrangement.

What I claim and desire to secure by Letters Patent of the United States is:—

1. In navigable vessels, the combination with the hull, of a buoyant endless chain formed of telescoping members carried by the hull, substantially as described.

2. In navigable vessels, the combination with the hull, of a buoyant endless chain formed of telescoping members carried by the hull, and means for guiding the endless chain without friction during operation thereof, substantially as described.

3. In navigable vessels the combination with the hull, of an endless buoyant chain formed of telescoping members carried by the hull, and means for interconnecting said members, substantially as described.

4. In navigable vessels, the combination with the hull, of an endless buoyant chain formed of telescoping members, means for interconnecting said members, and means for guiding the endless chain without friction during operation thereof, substantially as described.

5. In navigable vessels, the combination with the hull, of antifriction rollers carried thereby, an endless chain comprising telescoping buoyant members, and a guideway carried by the chain consisting of interconnected sections adapted to travel over the rollers, substantially as described.

6. In navigable vessels, the combination with the hull, of a guideway thereon, an endless buoyant chain, a guideway carried thereby, and a series of antifriction rollers interposed between the two guideways, substantially as described.

7. In navigable vessels, the combination with the hull, of a guideway thereon, an endless buoyant chain, a guideway carried thereby, a series of antifriction rollers interposed between the two guideways, and means for transmitting motion to the endless chain from the rollers, substantially as described.

8. In navigable vessels, the combination with the hull, of a plurality of buoyant members, and a plurality of links set at an angle to the horizontal line of movement, for interconnecting said members to form a chain, substantially as described.

9. In a navigable vessel of the type set forth, means for preventing entrance of water between the endless buoyant chain and the hull, substantially as set forth.

In testimony whereof I have hereunto set my hand in the presence of two witnesses.

HERBERT FRANCIS ALEXANDER.

Witnesses:
CECIL H. THOMPSON,
ALFRED PICKWORTH.